(12) United States Patent
Doi

(10) Patent No.: US 7,483,900 B2
(45) Date of Patent: Jan. 27, 2009

(54) INFORMATION SHARING SYSTEM AND INFORMATION SHARING METHOD

(75) Inventor: Miwako Doi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 352 days.

(21) Appl. No.: 10/687,736

(22) Filed: Oct. 20, 2003

(65) Prior Publication Data

US 2004/0133547 A1 Jul. 8, 2004

(30) Foreign Application Priority Data

Oct. 22, 2002 (JP) ............................. 2002-307576

(51) Int. Cl.
*G06F 17/30* (2006.01)
(52) U.S. Cl. ................ 707/100; 707/2; 707/3; 707/9; 707/10; 707/102; 715/234; 382/174
(58) Field of Classification Search ............ 707/3, 707/9, 10, 100, 102, 2; 715/513; 382/181, 382/173
See application file for complete search history.

(56) References Cited

U.S. PATENT DOCUMENTS

| | | | |
|---|---|---|---|
| 4,893,270 A | | 1/1990 | Beck et al. |
| 5,705,980 A | * | 1/1998 | Shapiro .................. 340/539.11 |
| 5,930,391 A | * | 7/1999 | Kinjo .......................... 382/173 |
| 6,275,824 B1 | * | 8/2001 | O'Flaherty et al. ............. 707/9 |
| 7,111,164 B2 | * | 9/2006 | Kinoshita .................... 713/166 |
| 7,181,438 B1 | * | 2/2007 | Szabo ........................... 707/2 |

FOREIGN PATENT DOCUMENTS

| | | |
|---|---|---|
| JP | 6-83847 | 3/1994 |
| JP | 2000-311251 | 11/2000 |
| JP | 2001-167201 | 6/2001 |
| JP | 2002-73905 | 3/2002 |

OTHER PUBLICATIONS

"Toward Realization of A Ubiquitous Network", Study Group on Future Prospects of Ubiquitous Network Technology in Ministry of General Affairs, <URL:http://www.soumu.go.jp/s-news/2002/pdf/020611_4_1.pdf>.
Keihin Office of River, <URL: http://www.keihin.ktr.mlit.go.jp/index_top.html<.
Notification of the First Office Action mailed Aug. 26, 2005, by the Chinese Patent Office, in Chinese Patent Application No. 200310102710.7.
Notification of Reasons for Rejection issued by the Japanese Patent Office on Jun. 26, 2007, for Japanese Patent Application No. 2002-307576, and English-language translation thereof.

* cited by examiner

*Primary Examiner*—Apu M Mofiz
*Assistant Examiner*—Monica M Pyo
(74) *Attorney, Agent, or Firm*—Finnegan, Henderson, Farabow, Garrett & Dunner, L.L.P.

(57) ABSTRACT

An information sharing apparatus comprises extracting unit extracting personal information item from acquired information item which includes personal information item, generating unit generating anonymous information item by deleting personal information item from acquired information item, storing unit storing personal information item and anonymous information item, storing unit storing first access level assigned to group of users who can access only anonymous information item, and to store second access level assigned to group of users who can access both of anonymous information item and personal information item, receiving unit receiving request message for accessing acquired information item, transmitting unit transmitting only anonymous information item when access level predetermined to user is equal to first access level, synthesizing unit synthesizing personal information item with anonymous information item, transmitting unit transmitting regenerated second information item, when access level of user is equal to second access level.

6 Claims, 13 Drawing Sheets

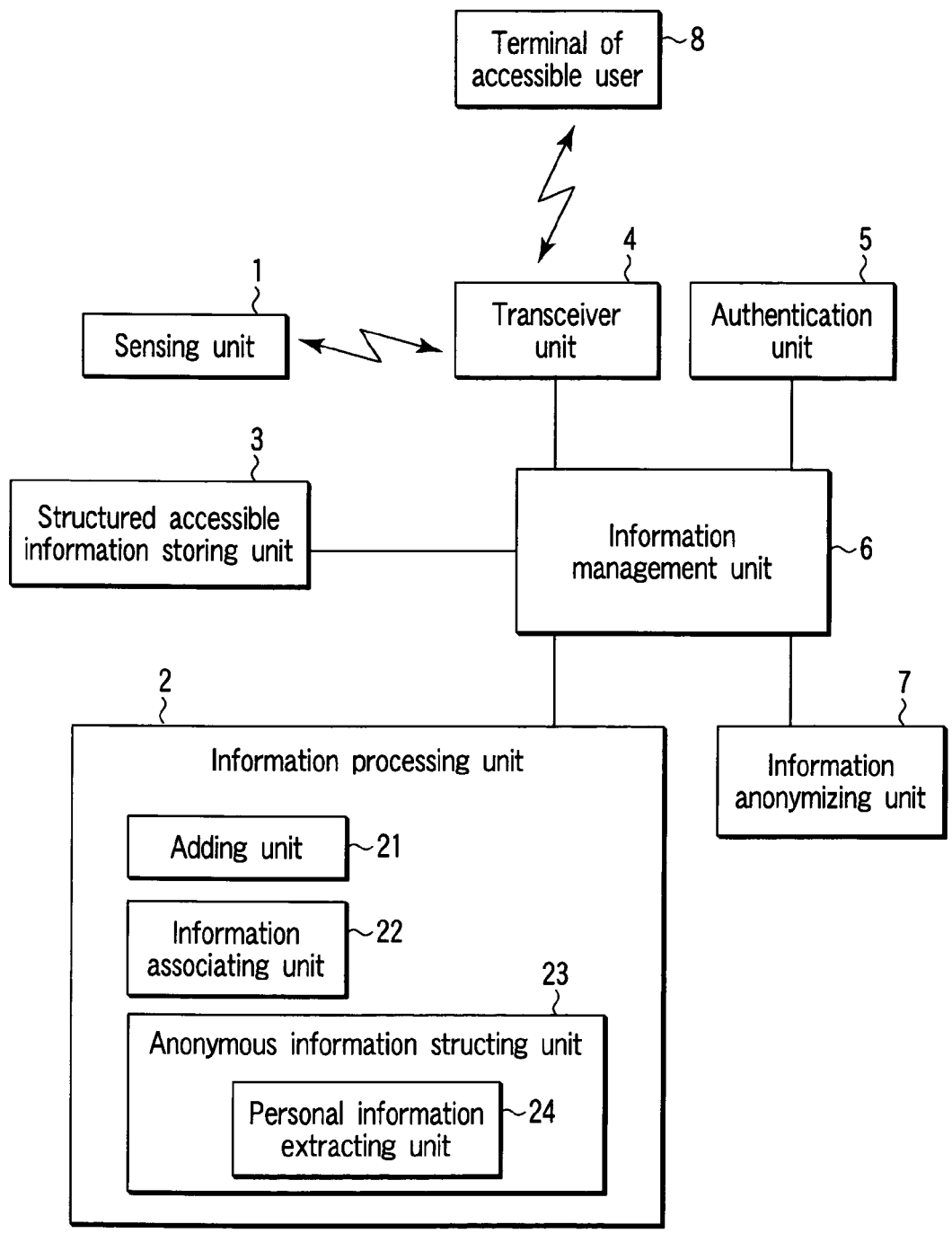
F I G. 1

| Temporary ID | Information type | Access right | Region ID | Encryption type | Sex | Age | Information acquisition date | Vital data |
|---|---|---|---|---|---|---|---|---|
| ID1 | Pulse, GSR, body temperature, acceleration, action | High | 984562 | 18 | Female | 38 | 2002/09/10 | B1 |
| ID2 | Pulse, GSR, body temperature, acceleration, action | High | 984562 | 18 | Male | 55 | 2002/09/10 | B2 |
| ID3 | Pulse, GSR, body temperature, acceleration, action | High | 984562 | 10 | Male | 50 | 2002/09/10 | B3 |
| ID4 | Pulse, GSR, body temperature, acceleration, action | High | 984562 | 10 | Female | 61 | 2002/09/10 | B4 |
| ... | ... | ... | ... | ... | ... | ... | ... | ... |

FIG. 5

| Personal information |
|---|
| P1 |
| P2 |
| P3 |
| P4 |
| ... |

FIG. 6

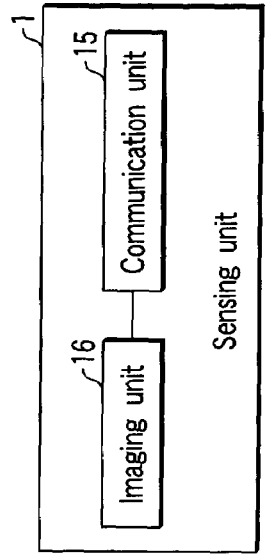

FIG. 8

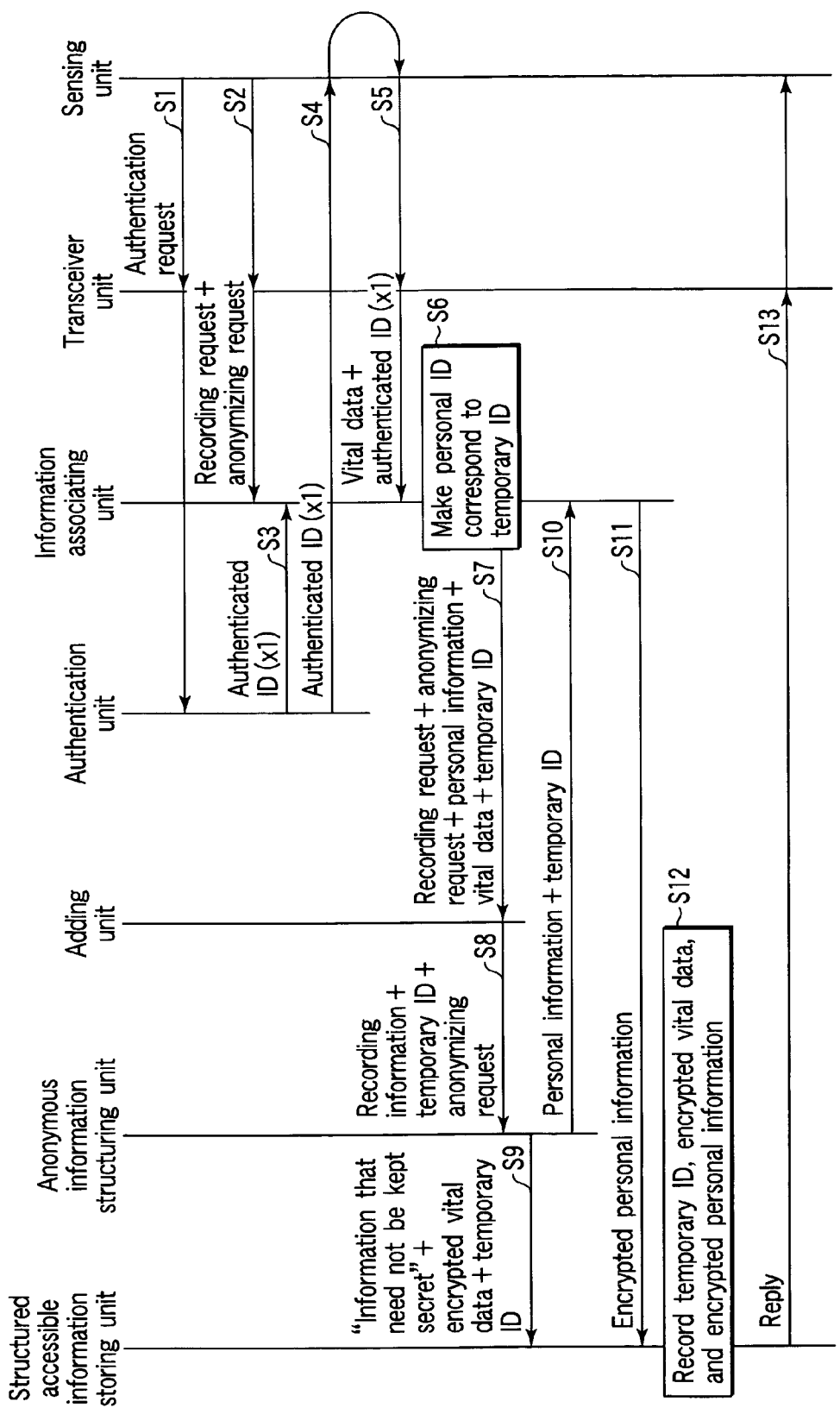
F I G. 7

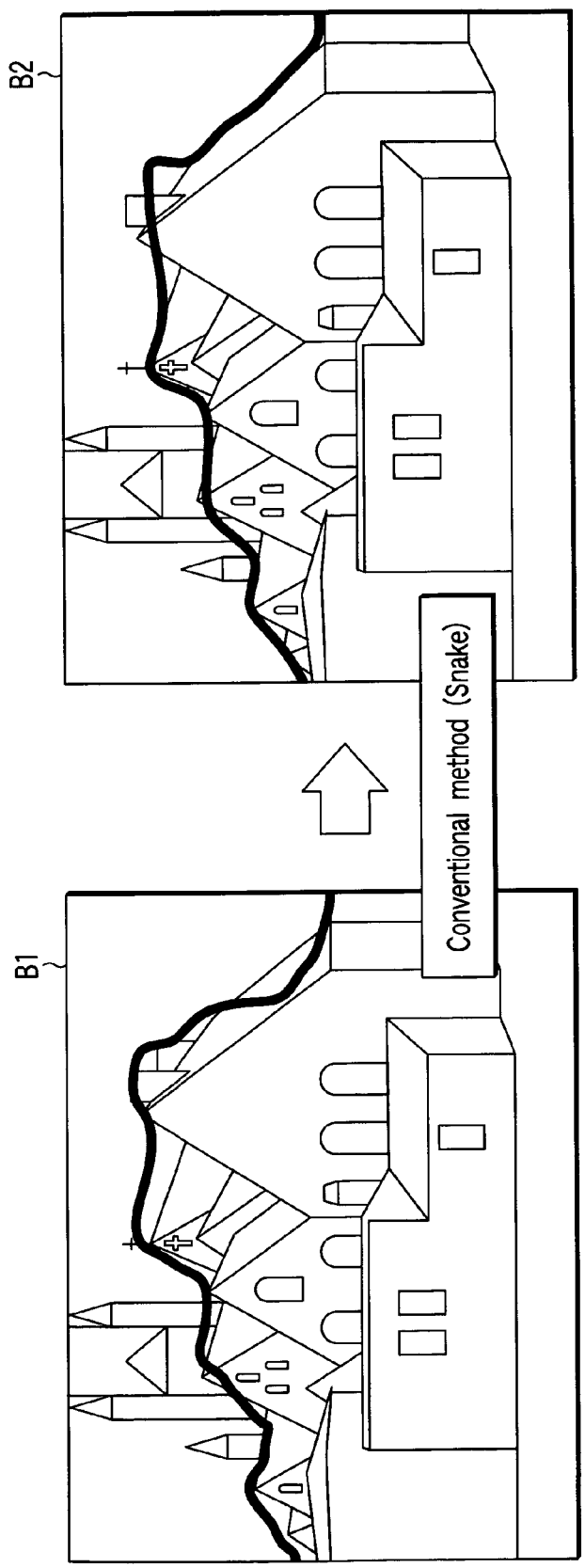
F I G. 10

Personal information

Anonymous information

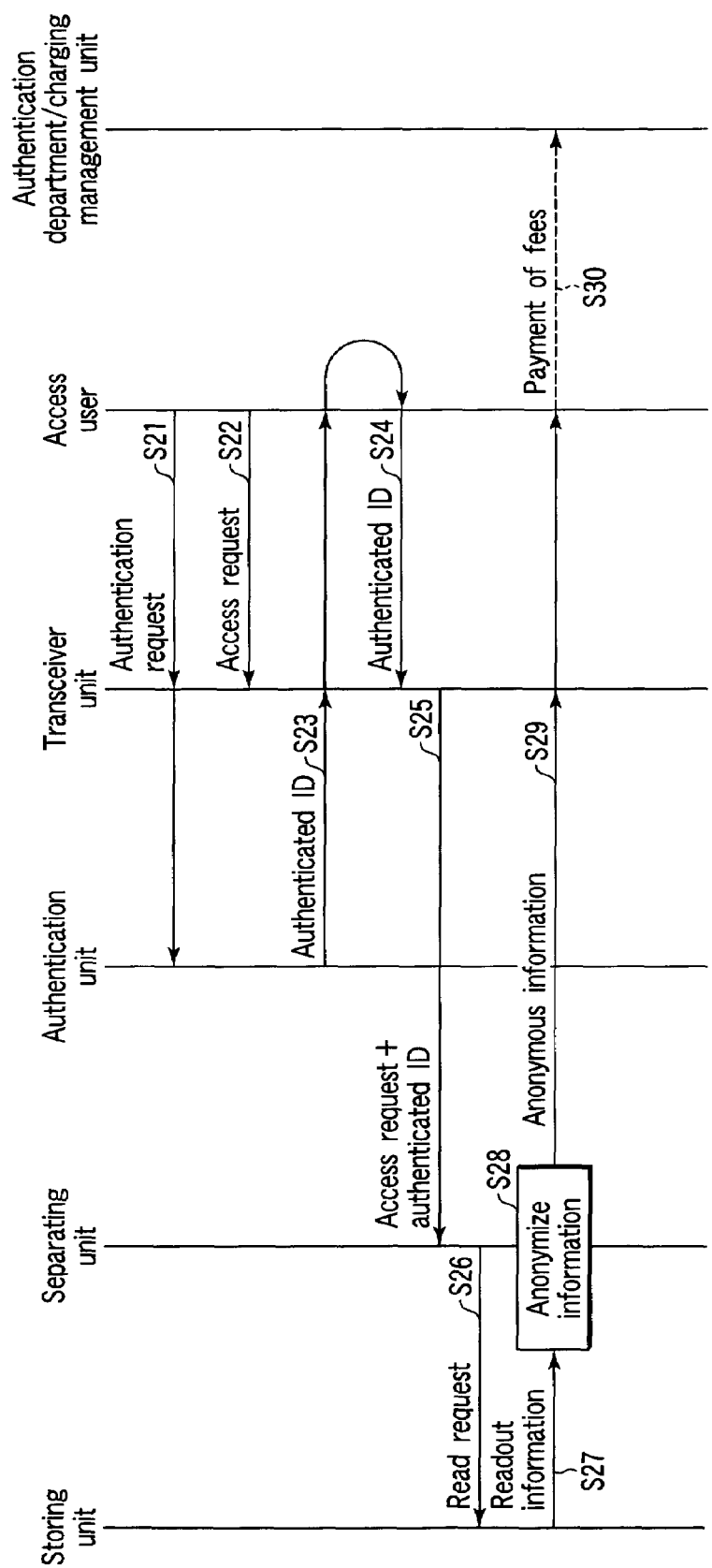
F I G. 15

INFORMATION SHARING SYSTEM AND INFORMATION SHARING METHOD

CROSS-REFERENCE TO RELATED APPLICATIONS

This application is based upon and claims the benefit of priority from the prior Japanese Patent Application No. 2002-307576, filed Oct. 22, 2002, the entire contents of which are incorporated herein by reference.

BACKGROUND OF THE INVENTION

1. Field of the Invention

The present invention relates to a system which uses collected information for data mining or the like while maintaining privacy of personal information included in the collected information.

2. Description of the Related Art

In recent years, computers are existing everywhere without being noticed. Ubiquitous computing which assists daily life and ubiquitous networks that connect ubiquitous computers are extensively being studied ("Toward Realization of a Ubiquitous Network", Study Group on Future Prospects of Ubiquitous Network Technology in Ministry of General Affairs, <URL: http://www.soumu.go.jp/s-news/2002/pdf/020611_4_1.pdf>).

A scale having an IrDA is commercially available. When the user weighs himself/herself, the scale automatically transmits the measured weight and body fat percentage to a personal computer through a network. A home healthcare system is also under development, in which when the user uses the toilet, the weight, blood pressure, pulse, and blood glucose level are measured and transmitted to a health control center or the like through a network.

As size reduction of acceleration sensors progresses, high-performance pedmeters are becoming commercially available. There are some commercially available pedmeters which can cause a personal computer to manage measured data through a USB (Universal Serial Bus).

A railway company introduced 2002 a service that uses a combination of a pass and a prepaid card using a noncontact IC card with extensive advertisements. In the service that combines a pass and a noncontact IC card, the holder of each noncontact IC card pass can be specified. The service provider, i.e., the railway company can grasp the movement of the holder of each noncontact IC card pass and the time of his/her action although the follow-up range is limited to the railway network of that company.

To cope with the increase in number of heinous crimes, there are installed many security/monitor cameras in bank ATMs, convenience stores, amusement centers, and elevator halls or cages of multistoried apartments. The monitor cameras continuously sense images at an interval of 1 to 10 sec on a 24-hour basis. In case of an actual offense, recorded images are offered to the police and the like.

Images sensed by monitor cameras which are installed to observe the water levels of rivers or rainfalls are open to the public through cable TVs or Web. Cable TVs are exclusive services for only subscribers and are therefore charged for. However, there are some images that can be seen at an interval of 10 min in real time without charge (top page of Keihin Office of River, <URL: http://www.keihin.ktr.mlit.go.jp/index_top.html>).

That is, for various purposes such as crime prevention and health control, various kinds of sensing devices such as cameras and vital or living-body sensors are installed at public sites including banks, stations, convenience stores, and amusement centers, or private locations including homes, or worn by individuals.

On the other hand, medical facilities want to not only manage the blood glucose levels of diabetics but also collect and mine enormous quantity of data about even reserves of "lifestyle" diseases and make use of the data for medical treatments and health instructions. All patients want only themselves and their doctors to browse their data. Even when the patients know that the data is useful for preventive medicine, they do not want their names revealed. If the data is to be used for study of preventive medicine, the patients wish that information related to the patient's privacy should be completely deleted, and only abstract information necessary for studies should be made open, like "female, age: 35, height: 163 cm, weight: 48 kg, blood pressure: 116-72, ..."

Currently, however, such work for keeping personal information secret is mainly done by doctors who use the data for studies. Only few doctors have knowledge about information protection such as firewall or can do programming to keep information secret. Even when doctors have such knowledge or ability, most of them have no sufficient time to handle and manage information.

In the distribution industry including convenience stores and supermarkets, it is required to know the merchandise buying tendency of each age group and gender and make use of the information for the next purchase of merchandise. In convenience stores, presently, a clerk looks at a customer and estimates and inputs, e.g., "middle-aged, man". If settlement using a point card or a portable cellular phone is introduced, the data can automatically be acquired.

On the other hand, the railway company can grasp the flow of passengers who use the noncontact IC card passes. On the basis of the data, the company can make a train service schedule or improve the station facilities. However, every noncontact IC card pass user expects that the personal information is protected even if his/her data is used.

An enormous quantity of information including personal information or private information such as images of street cameras, available railway information, personal vital data, and personal purchase information, which have not been handled as contents with clear awareness, can be processed as electronic data and distributed through networks. Every person wants to protect the information including personal information. On the other hand, companies, railway companies, medical facilities, and distribution industry want to mine data and use them as fundamental data for marketing or investment on plants and equipment. There is a bottleneck of interests between the two parties.

As described above, conventionally, there is no environment for effectively using information including personal information or information such as vital data or purchase information corresponding to personal information for different purposes while protecting the personal information.

It is therefore an object of the present invention to provide an information sharing method and information sharing system, which allow a third party to effectively use information including personal information while protecting the personal information.

BRIEF SUMMARY OF THE INVENTION (1) According to first aspect of the present invention, there is provided an information sharing apparatus, which communicates with at least one terminal corresponding to a first user of users, comprising: an acquiring unit configured to acquire a first information item which includes an anonymous information item and a personal information item, the personal information item corresponding to an informant of the anonymous information item; a separating unit configured to separate the personal information item from the first information item, to obtain the anonymous information item; a first storing unit configured to store the personal information item and the anonymous information item; a second storing unit configured to store a first access level which is assigned to a first group of users of the users who can access only the anonymous information item out of the anonymous information item and the personal information item, and to store a second access level which is assigned to a second group of users of the users who can access both of the anonymous information item and the personal information item; a receiving unit configured to receive a request message for accessing the first information item, the request message being transmitted from the terminal; a first transmitting unit configured to transmit only the anonymous information item out of the anonymous information item and the personal information item to the terminal in response to the request message, when an access level predetermined to the first user is equal to the first access level; a second transmitting unit configured to transmit both of the anonymous information item and the personal information item in response to the request message, when the access level of the first user is equal to the second access level.

(2) According to second aspect of the present invention, there is provided an information sharing apparatus, which communicates with at least one terminal corresponding to a first user of users, comprising: an acquiring unit configured to acquire a second information item which includes a personal information item; an extracting unit configured to extract the personal information item from the second information item, to obtain extracted personal information item; a generating unit configured to generate an anonymous information item by deleting the personal information item in the second information item; a first storing unit configured to store the extracted personal information item and the anonymous information item; a second storing unit configured to store a first access level which is assigned to a first group of users of the users who can access only the anonymous information item out of the anonymous information item and the personal information item, and to store a second access level which is assigned to a second group of users of the users who can access both of the anonymous information item and the personal information item; a receiving unit configured to receive a request message for accessing the second information item, the request message being transmitted from the terminal; a first transmitting unit configured to transmit only the anonymous information item out of the anonymous information item and the personal information item to the terminal in response to the request message, when an access level predetermined to the first user is equal to the first access level; a synthesizing unit configured to synthesize the personal information item with the anonymous information item, to obtain a regenerated second information item; a second transmitting unit configured to transmit the regenerated second information item in response to the request message, when the access level of the first user is equal to the second access level.

BRIEF DESCRIPTION OF THE SEVERAL VIEWS OF THE DRAWING

FIG. 1 is a block diagram schematically showing a configuration of an information anonymizing system according to the first embodiment of the present invention;

FIG. 5 is a table showing an example of storage of vital data and additional information in the storing unit;

FIG. 6 is a view showing an example of storage of personal information in the storing unit;

FIG. 7 is a sequence chart for explaining the processing operation of the information anonymizing system shown in FIG. 1 in recording information;

FIG. 8 is a block diagram showing another arrangement of the sensing unit shown in FIG. 1;

FIG. 10 is a view for explaining another method of extracting an information portion corresponding to personal information from acquired information;

FIG. 15 is a sequence chart for explaining the processing operation of the information anonymizing system shown in FIG. 1 in using information;

DETAILED DESCRIPTION OF THE INVENTION

The embodiments of the present invention will be described below with reference to the accompanying drawing.

First Embodiment

FIG. 1 shows the schematic configuration of an information anonymizing system 100 according to the first embodiment. A sensing unit 1 is, e.g. a camera installed on a street or a terminal apparatus (FIG. 2) which measures user's vital data (pulse, GSR (Galvanic Skin Reflex), acceleration that represents a user's motion state, and the like). When the sensing unit 1 is a camera, an image (including both a still image and a moving image) sensed by the camera is transmitted to a transceiver unit 4. When the sensing unit 1 is a terminal apparatus shown in FIG. 2, vital data measured from the user who is wearing the terminal apparatus is transmitted to the transceiver unit 4.

Figure 2:
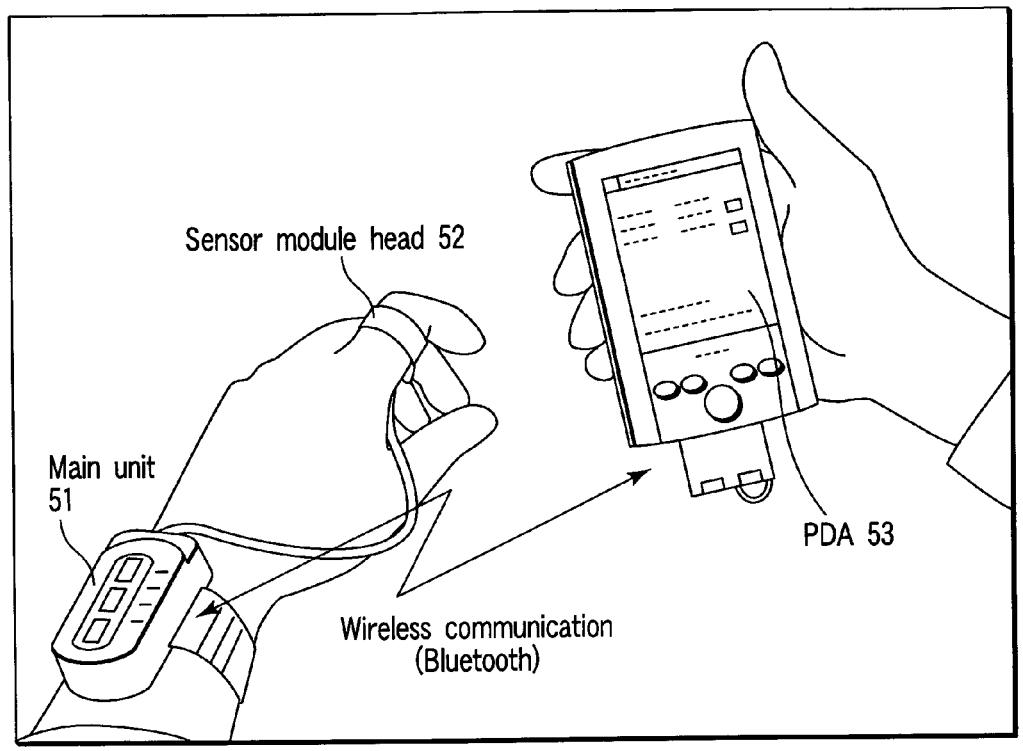
FIG. 2 is a view showing the outer appearance of a terminal corresponding to a sensing unit shown in FIG. 1.

The terminal apparatus shown in FIG. 2 mainly comprises a main unit 51 and a PDA (Personal Digital Assistant) 53. A sensor module head 52 to be wound around a user's finger is connected to the watch-like main unit 51 that the user wears.

The sensor module head 52 has sensors to measure GSR, pulse, acceleration, and the like. These sensors measure GSR, pulse, acceleration, and the like every msec. The measurement result is transmitted to the PDA 53 by short-distance wireless communication (e.g., Bluetooth) every, e.g., 50 msec.

GSR is the resistance value between two points on the skin surface. Generally, when man sweats on the skin surface, the skin resistance value decreases. When getting tense, the skin becomes sweaty. Since GSR indicates the degree of tense, it is used in a polygraph or the like.

The PDA 53 analyzes these pieces of vital data transmitted from the main unit 51 and determines the type of user's action such as walking, running, working, keeping rest, or taking a meal. The PDA 53 also gives the user an advice such as "30 minutes after meal. Take medicine!" or "Have you measured the blood glucose level?"

Figure 3:
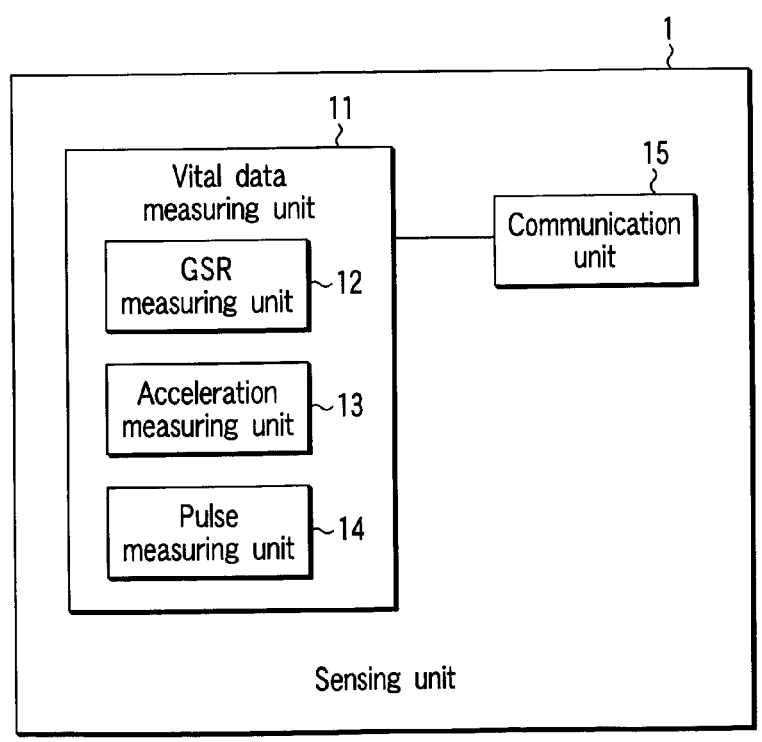
FIG. 3 is a block diagram showing the schematic arrangement of the sensing unit shown in FIG. 1.

FIG. 3 shows the functional arrangement of the terminal apparatus shown in FIG. 2, i.e., the sensing unit 1. The sensing unit 1 is constituted by a vital data measuring unit 11 and a communication unit 15. The vital data measuring unit 11 comprises a GSR measuring unit 12 which measures GSR and skin temperature, a wave measuring unit 13 which causes a photoelectric pulse wave sensor or the like to measure pulse, and an acceleration measuring unit 14 which causes a biaxial acceleration sensor to measure acceleration. The communication unit 15 wirelessly transmits the result. For example, the vital data measuring unit 11 shown in FIG. 3 corresponds to the main unit 51 including the sensor module head 52 shown in FIG. 2. The communication unit 15 corresponds to the PDA 53 shown in FIG. 2.

Figure 4:
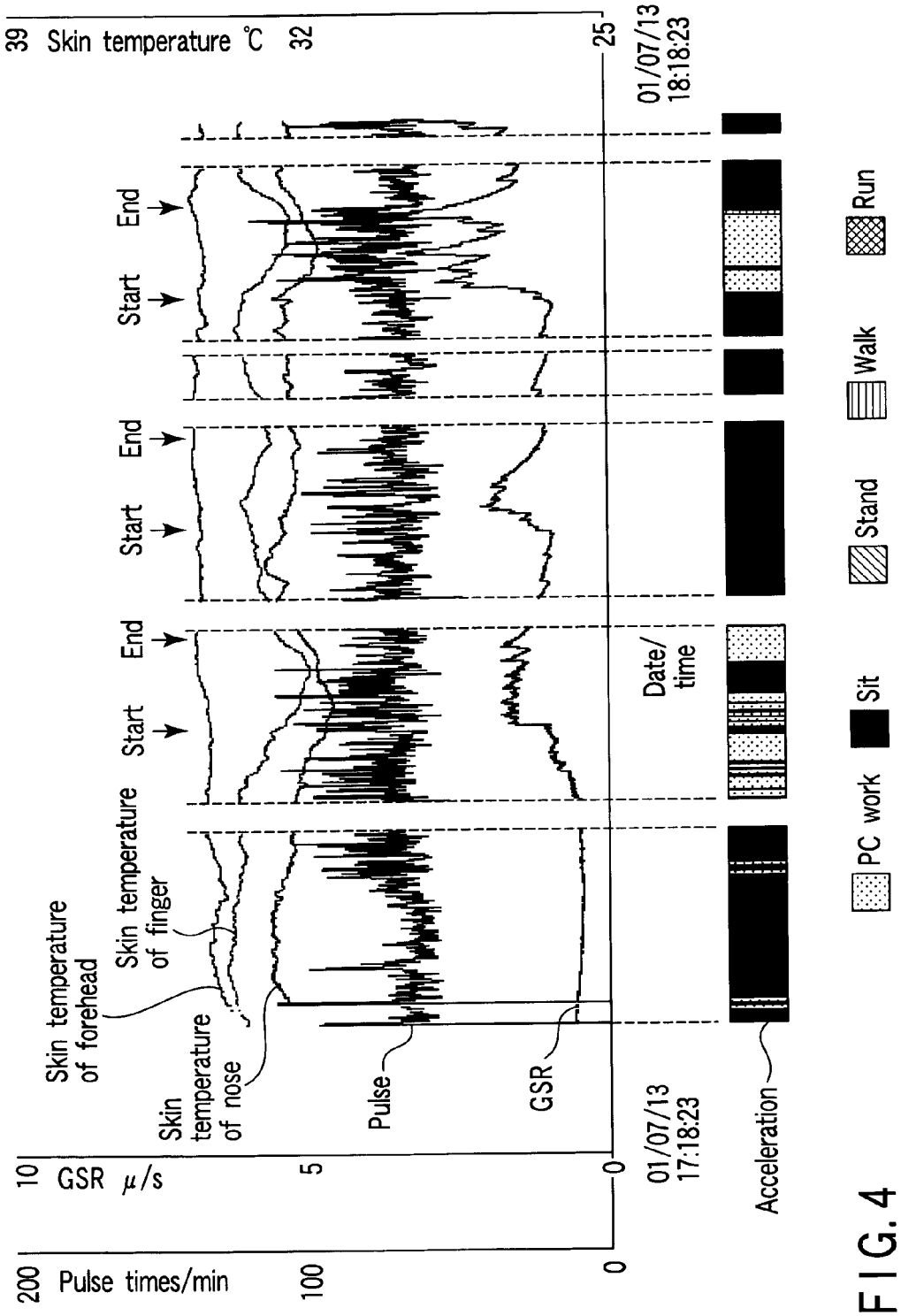
FIG. 4 is a graph showing a detailed example of vital data.

FIG. 4 shows vital data such as the skin temperature, pulse, GSR, and acceleration measured by the measuring units. The plurality of kinds of vital data are transmitted from the communication unit 15 to the transceiver unit 4 shown in FIG. 1 as sensing information.

FIG. 4 is a graph of actually measured skin temperature, pulse, GSR, and acceleration. The skin temperature, pulse, GSR, and acceleration are chronologically stored in correspondence with each measurement time. As shown at the lower portion of FIG. 4, the types of action such as "PC work", "sit", "stand", "walk", and "run" are determined from the acceleration.

In the above description, the sensing unit 1 acquires vital data as sensing information. However, the present invention is not limited to this. Information other than vital data may be acquired.

Vital data generally is used in a set of the vital data and additional information that makes it possible to identify the person to whom the vital data belongs. More specifically, such information (e.g., personal information such as a personal ID or name) that can be used to identify an individual is always integrated with vital data and managed. However, in the information anonymizing system according to this embodiment, such information (a kind of "information to be kept secret") that is used to specify an individual is separated from vital data and stored such that the vital data can be used for data mining or the like later.

Personal information includes pieces of information that specify an individual, i.e., the name, address, telephone number, photograph of face, insurance number, and bank account number of an individual and other private information that must be kept secret from a third party. Such personal information can be regarded as secret information that must be held in confidence, i.e., "information to be kept secret".

An information processing unit 2 adds, to information (sensing information) collected by the sensing unit 1, information to be used to access the sensing information later. When "information to be kept secret" is included in or associated with the sensing information itself, the information processing unit 2 separates the "information to be kept secret" from the sensing information to generate recording information to be recorded in a structured accessible information storing unit 3. The information processing unit 2 includes an adding unit 21, information associating unit 22, and anonymous information structuring unit 23.

When the sensing unit 1 outputs a plurality of kinds of sensing information, the information associating unit 22 associates the plurality of kinds of sensing information with each other in the order of measurement times, as shown in FIG. 4.

The adding unit 21 generates additional information (i.e., additional information including the type indicator of sensing information, information acquisition date/time, sensing information encryption method, information (level information) representing the level of the access right that limits access users who can access the sensing information, and information about the source of the sensing information) to be added to each sensing information. The adding unit 21 also generates recording information including vital data and additional information. The recording information generated here still includes both the "information to be kept secret" and information that need not to do so. The anonymous information structuring unit 23. separates the "information to be kept secret" (especially the personal information) from the recording information. After that, the recording information is stored in the structured accessible information storing unit 3 in, e.g., the format shown in FIG. 5.

Referring to FIG. 5, identifiers "B1", "B2", . . . are added to the sensing information items. The sensing information items themselves are encrypted and stored in the structured accessible information storing unit 3 independently of the additional information.

The recording information shown in FIG. 5 will be described. "Information type" indicates the type of information and the manner of storage of the information. For example, it can immediately be determined on the basis of the information type whether the information is useful for marketing. "Access right" is defined in advance in accordance with each recording information items to limit users (accessible users) of the recording information. Vital data included in the recording information item s assigned an access right of high level. When there are access rights of three levels, i.e., "low", "medium", and "high", the highest level, "high", is assigned to the vital data.

"Region ID" indicates the region where the source of information lives. "Encryption type" indicates the encryption method used to encrypt the sensing information. Not only public key encryption or secret key encryption but also partial encryption, total encryption, or a combination of a plurality of kinds of encryption may be employed. "Encryption type" means such type of encryption. In FIG. 5, a type indicated by a numerical value.

Since vital data is a kind of "information to be kept secret", it is encrypted and stored. Personal information of each individual, including the name and address of the source of information who has provided vital data, is also "information to be kept secret". Hence, the personal information is also encrypted and stored in the structured accessible information storing unit 3. The personal information is separated from recording information including vital data and additional information shown in FIG. 5 and separately stored as independent information. Hence, the recording information shown in FIG. 5 is anonymized information, i.e., anonymous information. As shown in FIG. 5, each vital data stored in the structured accessible information storing unit 3 is stored separately from personal information (anonymized). Hence, the vital data is anonymous information.

FIG. 6 is a view for explaining an example of storage of personal information in the structured accessible information storing unit 3. Each personal information has an ID (personal ID) used to identify it. The personal IDs are indicated by "P1", "P2", . . . in FIG. 6. FIG. 6 shows only the personal IDs as personal information for the sake of simplicity. In fact, each personal information also includes data items such as the name and address (the data items are not illustrated in FIG. 6).

Only a temporary ID assigned to each recording information as shown in FIG. 5 makes personal information shown in FIG. 6 correspond to (associate with) vital data and other additional information shown in FIG. 5. A temporary ID is made to correspond to a personal ID (the ID (identifier) of personal information) by the information associating unit 22. Temporary IDs are given to pieces of recording information at random. Only the information associating unit 22 knows the correspondence between the temporary IDs and the personal IDs. That is, the information which indicates correspondence between the temporary IDs and the personal IDs is recorded in the information associating unit 22 so that only the information associating unit 22 can read out the information.

Of the pieces of recording information shown in FIG. 5, the information type, access right, region ID, sex, age, and acquisition date are not encrypted. These pieces of information can be referred to even without any special access right (even when, for example, an accessible user has an access right of lowest level).

The information anonymizing system shown in FIG. 1 also has the transceiver unit 4, an authentication unit 5, and an information anonymizing unit 7.

The transceiver unit 4 receives a recording request for sensing information transmitted from an information source side or an access request from an accessible user who wants to use sensing information recorded in the structured accessible information storing unit 3. The transceiver unit 4 also transmits information requested by an accessible user to that accessible user at the request source.

The authentication unit 5 authenticates authentication information which is transmitted from an accessible user side and received by the transceiver unit 4. The anonymizing unit 7 processes portions to be anonymized of the pieces of information stored in the structured accessible information storing unit 3 in accordance with the access right of the accessible user authenticated by the authentication unit 5.

The anonymous information structuring unit 23 in the information processing unit 2 separates "information to be kept secret" from recording information including information provided (sent) from an information source side.

FIG. 7 is a sequence chart for explaining the processing operation of the information anonymizing system until recording information including information (e.g., vital data) obtained by the sensing unit 1 is anonymized and stored in the structured accessible information storing unit 3.

An example will be described, in which the sensing unit 1 constituted by the terminal apparatus shown in FIG. 3 acquires vital data and sends the vital data as shown in FIG. 4 to the transceiver unit 4 through the communication unit 15. In this case, before transmission of vital data, the sensing unit 1 transmits an authentication request including authentication information first. The authentication request is transmitted to the authentication unit 5 through the transceiver unit 4 (step S1). The authentication information may be, e.g., a fingerprint or a photograph of face of the source of information, vital data such as an iris serving as authentication information, or authentication data (e.g., an authentication number or password) on an IC card incorporated in the terminal apparatus corresponding to the sensing unit 1 shown in FIG. 3.

On the basis of the authentication information included in the authentication request, the authentication unit 5 executes personal authentication. If the authentication request is authentic, the authentication unit 5 transfers an authenticated ID (or pass ID) (the value of the authenticated ID is "x1") to the information associating unit 22. Simultaneously, the authentication unit 5 returns an authenticated ID having the same value as that of the authenticated ID to the sensing unit 1 (steps S3 and S4). If the authentication request is inauthentic, the authentication unit 5 gives no authenticated ID, and the processing is interrupted.

In parallel to the authentication request, a recording request and anonymizing request to record the vital data from the sensing unit 1 in the information anonymizing system through the transceiver unit 4 are sent to the information associating unit 22 through the transceiver unit 4 (step S2). The information associating unit 22 receives the determination result from the authentication unit 5. If the determination result is "authentic", the information associating unit 22 holds the authenticated ID sent from the authentication unit 5 and waits for vital data sent from the sensing unit 1. If the authentication result is "inauthentic", the information associating unit 22 discards the recording request and anonymizing request without waiting for vital data from the sensing unit 1, and the processing is interrupted.

Upon receiving the authentication result that indicates "authentic", the sensing unit 1 sends the received authenticated ID and vital data to the transceiver unit 4 again through the communication unit 15 (step S5). The sensing unit 1 may also transmit, together with the vital data, personal information such as a personal ID to be used to identify the source of the vital data. The personal information is registered in advance in, e.g., the terminal (e.g., the PDA shown in FIG. 3) corresponding to the sensing unit 1.

Assume that vital data added with personal information is transmitted from the sensing unit 1. For example, in the information anonymizing system, the personal information of the source of information is registered in the structured accessible information storing unit 3 in advance. Vital data added with a personal ID is sent from the sensing unit 1. For example, the information associating unit 22 obtains, from the personal ID, other pieces of personal information such as the name corresponding to the personal ID. The pieces of personal information are made to correspond to the vital data transmitted from the sensing unit 1.

The transceiver unit 4 sends the personal information, vital data, and authenticated ID to the information associating unit 22. The information associating unit 22 determines whether the held authenticated ID ("x1") coincides with the received authenticated ID.

When the authenticated IDs coincide with each other, a temporary ID corresponding to the personal ID included in the personal information is generated at random. Data representing the correspondence between the generated temporary ID and the personal ID is stored in a table (step S6). If no personal ID is present, an ID that identifies the personal information may be generated and used as the personal ID. The generated temporary ID, vital data, personal information, recording request, and anonymizing request are sent to the adding unit 21 (step S7).

The personal information is defined in advance as "information to be kept secret". The access right for it has the highest level (preferably a level higher than the access right for vital data).

The adding unit 21 generates level information that defines the level of the access right that limits accessible users who can access the vital data and additional information (by referring to information included in the recording request or the personal information of the source of the vital data, as needed) in correspondence with the temporary ID. The adding unit 21 outputs recording information including the additional information, vital data, and personal information.

The temporary ID, recording information, recording request, and anonymizing request are sent to the anonymous information structuring unit 23 to anonymize the recording information (step S8).

The anonymous information structuring unit 23 separates the "information to be kept secret" from the recording information. The "information to be kept secret" means personal information and vital data. Of the recording information, pieces of information except the vital data and personal information are "information that need not be kept secret".

Of the pieces of "information to be kept secret" included in the recording information, information (i.e., personal information) to be integrated with the personal ID is separated from the recording information. Of the pieces of "information to be kept secret", information (i.e., vital data) other than the personal information is encrypted and sent to the structured accessible information storing unit 3 together with the temporary ID (step S9). At this time, the pieces of "information that need not be kept secret" are also sent to the structured accessible information storing unit 3.

The anonymous information structuring unit 23 sends the personal information separated from the recording information to the information associating unit 22 together with the temporary ID such that the personal information is integrated with the personal ID (step S10). The information associating unit 22 obtains the personal ID corresponding to the temporary ID from the table that stores the information item which represents the correspondence, integrates the personal information with the personal ID, encrypts the personal information, and sends it to the structured accessible information storing unit 3 (step S11).

The structured accessible information storing unit 3 stores the encrypted personal information (including the personal ID) sent from the information associating unit 22, as shown in FIG. 6. The structured accessible information storing unit 3 stores the temporary ID sent from the anonymous information structuring unit 23, and anonymous information including the encrypted vital data and the pieces of "information that need not be kept secret" in the format shown in FIG. 5 (step S12). Actually, since the vital data and personal information are encrypted, the contents of these pieces of information cannot easily be read. In addition, the processing for encrypting and storing the personal information in steps S10 and S11 need not always be executed if the personal information has already been stored in the structured accessible information storing unit 3. More specifically, in step S9, the personal information is separated from the recording information, the vital data is encrypted, and anonymous information including the encrypted vital data and other pieces of "information that need not be kept secret" and the temporary ID are stored in the structured accessible information storing unit 3. In this case, steps S10 to S12 may be omitted.

When the anonymous information is recorded, the structured accessible information storing unit 3 returns a reply representing the end of recording to the sensing unit 1 through the associating unit 22 (step S13).

With the above processing, the sensing information that is sent together with corresponding personal information is separated from the personal information and recorded in the structured accessible information storing unit 3.

In the above example, the vital data itself includes no information that specifies the individual. However, when the sensing unit 1 comprises an imaging unit 16 and the communication unit 15, as shown in FIG. 8, an image acquired by the imaging unit 16 can include personal information such as the face of the person, which can identify the individual. When the information sensed by the sensing unit 1 includes "information to be kept secret", which is related to the privacy of an individual, a personal information extracting unit 24 extracts the "information to be kept secret".

Figure 9:
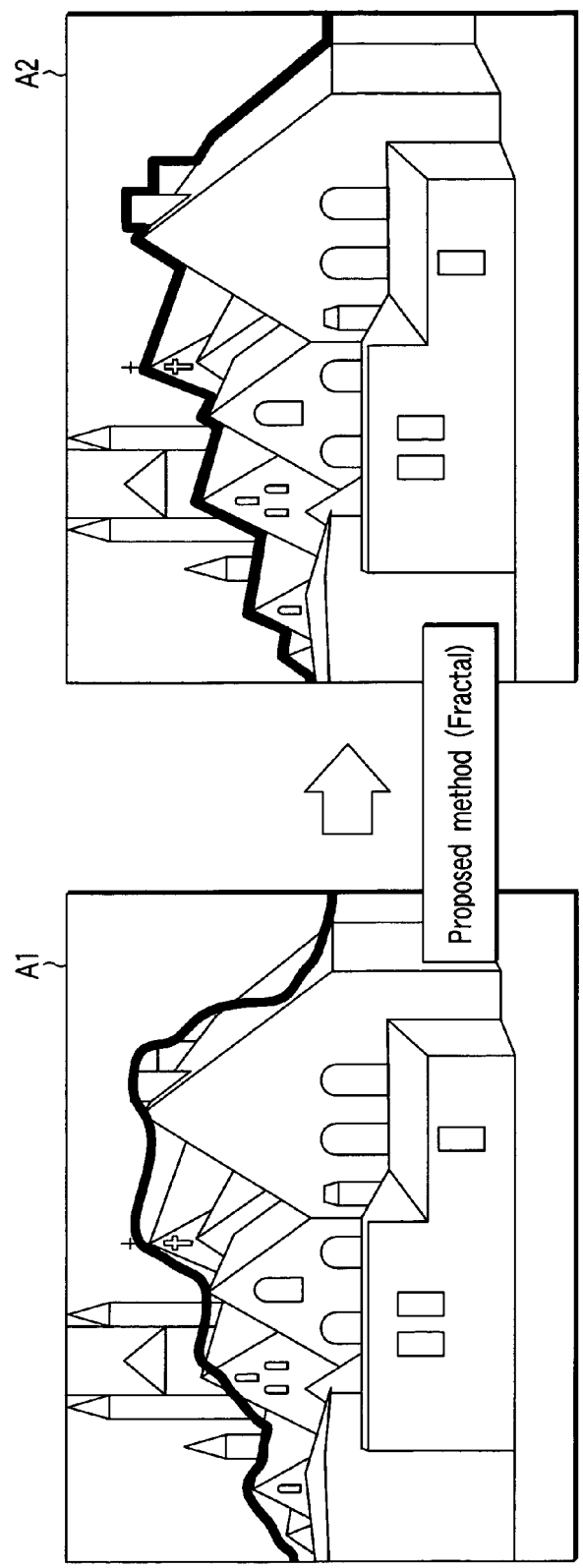
FIG. 9 is a view for explaining a method of extracting an information portion corresponding to personal information from acquired information.

In paragraphs [0155] and [0156] of Jpn. Pat. Appln. KOKAI Publication No. 2000-311251, a method of extracting an object from an image using fractal is described. For example, two extracting methods as shown in FIGS. 9 and 10 are used. FIGS. 9 and 10 show examples wherein the contour of buildings is extracted from the same image. An image A1 in FIG. 9 and an image B1 in FIG. 10 have the same initial contour (thick line) in the same image. An image A2 in FIG. 9 indicates the contour of buildings, which is extracted from the initial contour in the image A1 by using a fractal method. An image B2 in FIG. 10 indicates the contour of buildings, which is extracted from the initial contour in the image B1 by using a snake method.

FIG. 10 shows a method called snake, which extracts the contour (the white curved line that surrounds the buildings in FIG. 10) of an object with a minimum energy. In this case, since the energy is minimum, the contour is rounded, as indicated in the image B2. It is therefore difficult to accurately extract the contour of the sharp portions of the buildings.

To the contrary, the fractal method shown in FIG. 9 can extract even the contour of sharp portions by increasing the fractal value (the degree of repetition of similar shapes). Hence, even the contour of the sharp portions of the buildings can be accurately extracted, as indicated in the image A2, unlike the snake method.

Figure 11:
FIG. 11 is a view showing a detailed example of image information including personal information, which is acquired by the sensing unit.

Only a portion ("information to be kept secret") associated with the privacy of an individual can be extracted from, e.g., the image shown in FIG. 11 by using the above extracting method.

Figure 12:
FIG. 12 is a view showing the personal information included in the image shown in FIG. 11.
Figure 13:
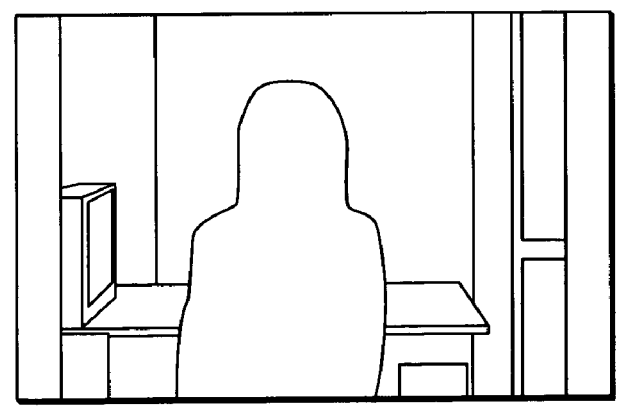
FIG. 13 is a view showing anonymous information obtained by deleting the personal information from the image shown in FIG. 11.

FIG. 12 shows the image information of a person, which is obtained as personal information extracted by the personal information extracting unit 24 from the image shown in FIG. 11. FIG. 13 shows anonymous information obtained by deleting or mosaicing the personal information in the image shown in FIG. 11 to make the personal information (the image of the person shown in FIG. 12) secret.

Figure 14:
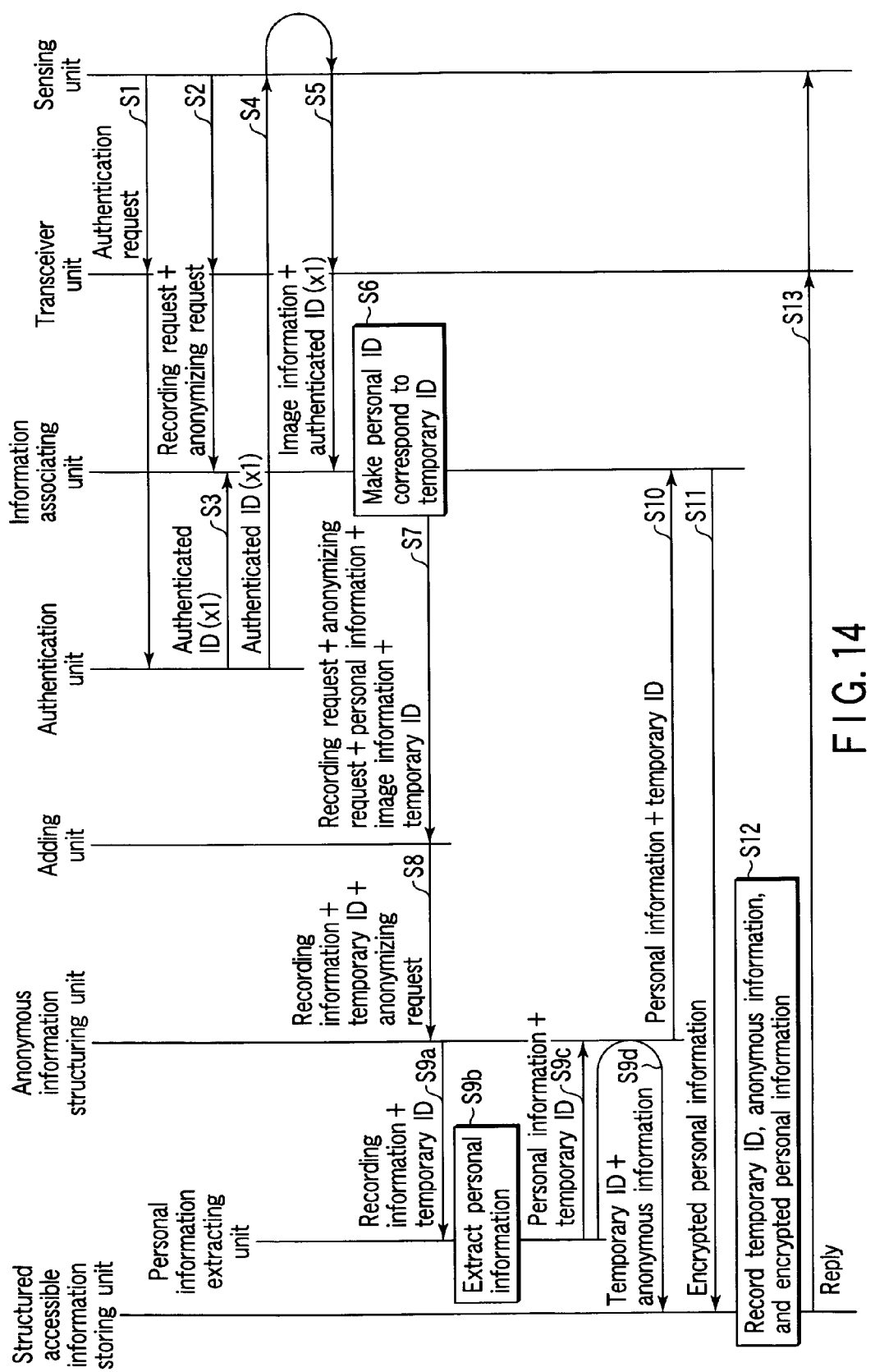
FIG. 14 is a sequence chart for explaining another processing operation of the information anonymizing system shown in FIG. 1 in recording information.

FIG. 14 is a sequence chart for explaining another processing operation of the information anonymizing system. FIG. 14 shows the processing operation after the personal information extracting unit 24 extracts "information to be kept secret" (personal information) from information (image information) acquired by the sensing unit 1 until the information acquired by the sensing unit 1 is anonymized and stored in the structured accessible information storing unit 3. The personal information in the image information is the image of an individual. Hence, in this case, the personal information is included in advance in the image acquired by the sensing unit 1 as sensing information. This case is the same as the case shown in FIG. 7 wherein part of vital data acquired by the sensing unit 1 as sensing information is personal information.

Processing in steps S1 to S8 in FIG. 14 is the same as in FIG. 7, and a description thereof will be omitted. In step S6 in FIG. 14, a personal ID is generated and stored in correspondence with a temporary ID.

Processing from step S8 in FIG. 14 will be described. More specifically, in step S8, the temporary ID, recording information including additional information and image information including personal information and the like, an recording request, and an anonymizing request are sent to the anonymous information structuring unit 23. The recording information and temporary ID are sent to the personal information extracting unit 24 together with a request to extract the personal information from the recording information (step S9a).

The personal information extracting unit 24 extracts, from the image information in the recording information, the image portion of the person, i.e., personal information as "information to be kept secret" by using the fractal method (step S9b). The extracted personal information (image portion of the person) and the temporary ID are sent to the information associating unit 22 to be integrated with the personal ID by the anonymous information structuring unit 23 (steps S9c and S10).

On the other hand, the personal information extracting unit 24 converts the image information in the recording information into anonymous information. More specifically, the personal information extracting unit 24 executes anonymizing processing for the image information by deleting or mosaicing a portion corresponding to the personal information extracted from the image information. For example, the personal information extracting unit 24 deletes a portion corresponding to the personal information extracted from the image information by overwriting the personal information portion with arbitrary symbols. Anonymous information obtained by this anonymizing processing is transferred to the structured accessible information storing unit 3 together with the temporary ID (step S9d). The anonymous information may be encrypted. The adding unit 21 in the information processing unit 2 adds, as additional information, level information that defines the level of the access right that limits accessible users to the personal information extracted from the image information.

The information associating unit 22 integrates the personal information with the personal ID on the basis of the correspondence between temporary ID and personal ID, which is stored in advance in the table. The information associating unit 22 then encrypts the personal information and sends it to the structured accessible information storing unit 3 (step S11).

The structured accessible information storing unit 3 stores the encrypted personal information sent from the information associating unit 22 and the anonymous information (the anonymous information may be encrypted) and the temporary ID which are sent from the anonymous information structuring unit 23 in, e.g., the formats shown in FIGS. 5 and 6 (step S12). After that, the structured accessible information storing unit 3 returns a reply representing the end of recording to the sensing unit 1 (step S13).

The processing operation of the information anonymizing system when an access request is received from an accessible user will be described next with reference to FIG. 15.

Assume that an accessible user wants to know how the degree of concentration during PC work changes in accordance with the work time in one week. In this case, the degree of concentration can be known from the GSR value. Hence, e.g., the following search request text is described in the XML (extensible Markup Language) format and sent.

{category: males & females, item 1: PC work time/week, item 2: degree of concentration}

For the search request text, the terminal side of the access user or, e.g., an information management unit 6 of the information anonymizing system that has received the search request text may convert the name of "item" representing the type of information to be searched in the search request text to a name representing the type of information actually stored in the structured accessible information storing unit 3 such that the search request text itself can be adapted to the information anonymizing system. For example, the search request text is converted to {category: males & females, item 1: PC work time/week, item 2: GSR}

Before the terminal of the accessible user issues an access request including the search request text, an authentication request including authentication information is sent to the authentication unit 5 through the transceiver unit 4 (step S21). After that, the access request is transmitted (step S22). The authentication unit 5 confirms whether the access of the accessible user is permitted. Permission of use of information in the system is given by an authentication department separately provided. An accessible user who is permitted in advance to use the information in the system is authenticated using a given public key.

If the public key is not correct, the authentication unit 5 gives no authenticated ID. Hence, the accessible user cannot use the information anymore.

When the accessible user is successfully authenticated by the authentication unit 5, an authenticated ID including level information that defines the level of the access right defined for the accessible user is transferred to the transceiver unit 4 (step S23). Alternatively, the authenticated ID is temporarily transmitted to the terminal of the accessible user through the transceiver unit 4. The authenticated ID transmitted from the terminal of the accessible user may be received (step S24).

The transceiver unit 4 sends the access request sent from the accessible user and the authenticated ID returned from the authentication unit 5 (or transmitted from the terminal of the accessible user) altogether to the information anonymizing unit 7 (step S25).

On the basis of the received access request, the information anonymizing unit 7 sends a read request to the structured accessible information storing unit 3 to read out the requested information (e.g., information corresponding to the search request text included in the access request) (step S26). The structured accessible information storing unit 3 separately stores the anonymous information and personal information, as shown in FIGS. 5 and 6.

Information to be searched by the search request text having a designated "category", like the above search request text, is irrelevant to personal information. For this reason, on the basis of the level of the access right of the accessible user, information with level that can be made open to the accessible user is provided to him/her.

The category is "males & females". All the pieces of information shown in FIG. 5 belong to this category. Hence, all the pieces of information (including pieces of encrypted vital data that are separately recorded) shown in FIG. 5 are read out and sent to the anonymizing unit 7 (step S27).

When the readout information includes information to be anonymized in accordance with the level of the access right included in the authenticated ID, the anonymizing unit 7 anonymizes the information. When the readout information includes information that should not be made open to the accessible user, the anonymizing unit 7 deletes the information (step S28). For example, each information shown in FIG. 5 has no information to be kept secret because personal information has already been separated. However, the temporary ID used to associate the personal information still remains. Hence, in this example, the temporary ID is deleted from each readout anonymous information.

The access right is defined for each accessible user in advance. The access right is information that specifies the level of usable information for each accessible user. In the above example, an accessible user who can receive vital data from the search request text must have in advance a permission of access to at least vital data. Even when the accessible user is permitted to access vital data, he/she cannot know the person to whom the vital data belongs if he/she is not permitted to access personal information. When the physician in charge of the source of the vital data is the accessible user, the access right may be defined such that the accessible user can access both the vital data and personal information of the source of the vital data.

In addition, in recording "information to be kept secret" such as vital data, the access right ("low", "medium", and "high") defined for the "information to be kept secret" to be recorded may be used as the access right of the accessible user. For example, when the access right to vital data is "medium", the access right of an accessible user who can access vital data may have to be "medium" or one of "medium" and "high". When the access right to personal information is "high", the access right of an accessible user who can access personal information may have to be "high".

The information (anonymous information) that has undergone necessary processing by the information anonymizing unit 7 is transmitted to the terminal of the accessible user (step S29).

Figure 16:
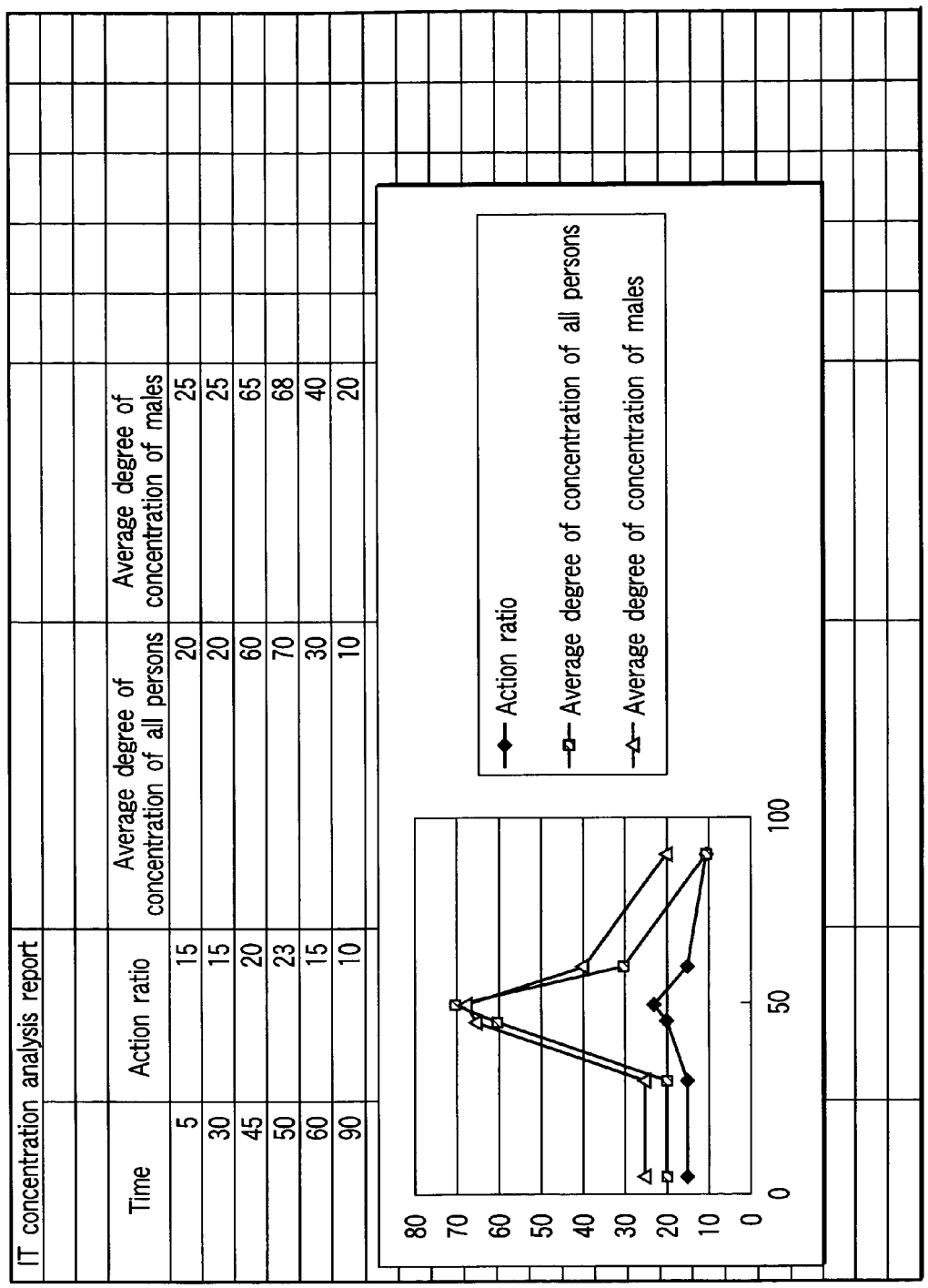
FIG. 16 is a view showing an example of a report created on the basis of information provided from the information anonymizing system shown in FIG. 1.

Upon receiving the anonymous information transmitted from the information anonymizing system, the terminal of the accessible user arranges the data in the anonymous information, as shown in, e.g., FIG. 16, so that a report including the PC work time per week, the ratio of doers who are doing that action, the average degree of concentration of all persons, and the average degree of concentrate of only males can be obtained.

The accessible user pays the compensation for information use to the charging management unit (step S30). The authentication department that permits information use also serves as the charging management unit. Payback corresponding to the information providing amount may be done for each source of information. Alternatively, a banking agency that has a contract with the source of information may serve as the charging management unit such that a remittance can be made to the banking agency.

Assume that an access request to information such as the above-described image information is issued. Image information is anonymized in advance and recorded. If the level of the access right given to the accessible user is too low to access the personal information in the image information, only anonymous information stored in the structured accessible information storing unit 3 is provided. If the level of the access right given to the accessible user permits access to personal information in the image information, anonymous information is read out from the structured accessible information storing unit 3. Simultaneously, a personal ID corresponding to the (temporary ID of) anonymous information is obtained from the table stored in the information associating unit 22. Then, personal information corresponding to the personal ID is read out from the structured accessible information storing unit 3. For example, the information anonymizing unit 7 synthesizes the readout personal information with the anonymous information to generate the original image information. The original image including the synthesized personal information is transmitted to the accessible user at the information request source through the transceiver unit 4. In this way, the anonymizing unit 7 also executes processing for returning the processed portion in the anonymous information, i.e., the portion corresponding to the personal information to the original state.

In the above embodiment, the sensing unit 1 is independently arranged as a terminal apparatus. The sensing unit 1 transmits/receives data to/from the information anonymizing system incorporated in a home server or the like via wireless communication. The present invention is not limited to this arrangement. As the small device technology is developed, a large memory capacity can be ensured as in a current home server. A portable sensing unit 1 that is incorporated in the information anonymizing system, as shown in FIG. 17, may be available.

Figure 17:
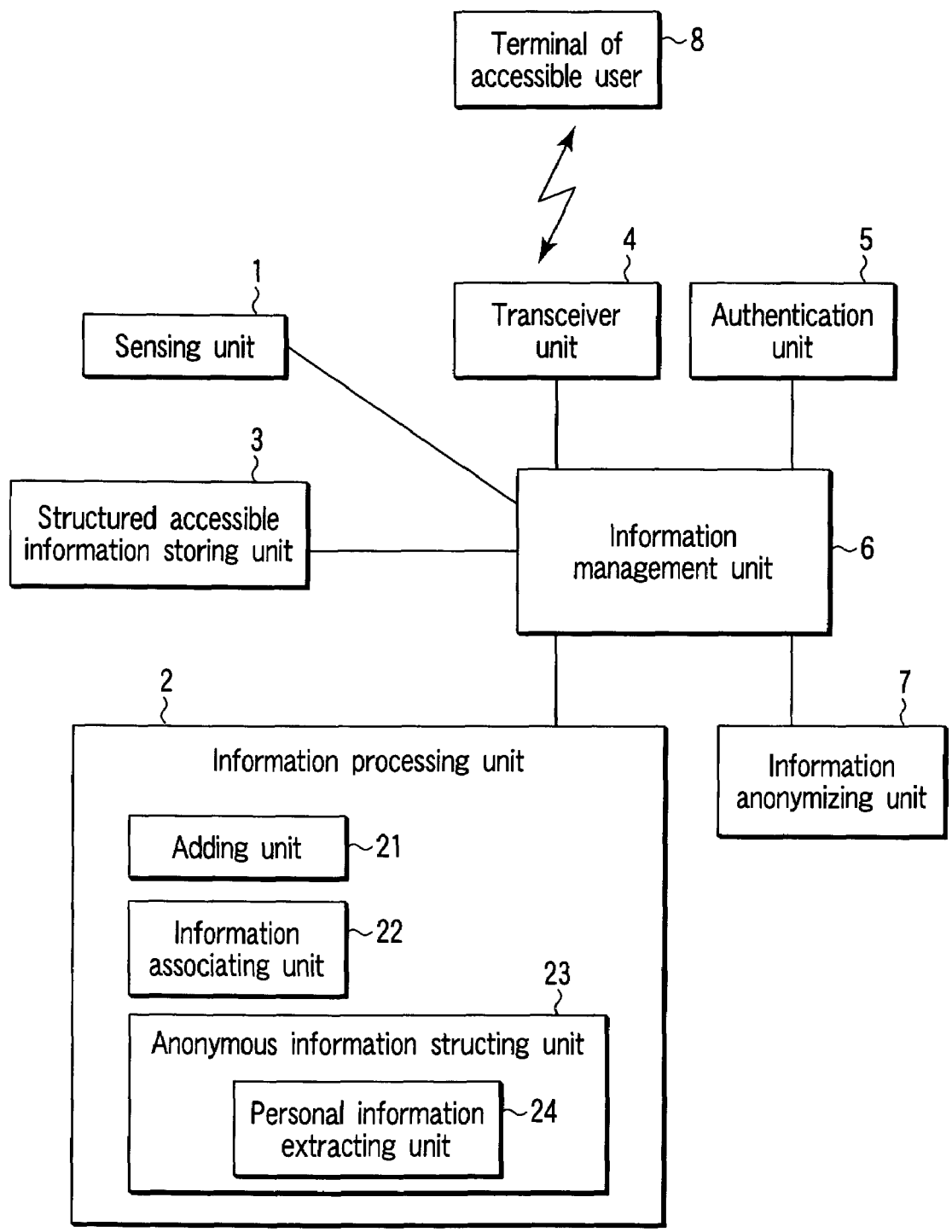
FIG. 17 is a block diagram schematically showing another configuration of the information anonymizing system according to the first embodiment of the present invention.

The same reference numerals as in FIG. 1 denote the same parts in FIG. 17. FIG. 17 is different from FIG. 1 only in that the sensing unit 1 is incorporated in the information anonymizing system.

The above embodiment assumes that medical facilities are accessible users, and individuals are sources of information. However, the present invention is not limited to this. For example, individuals may be accessible users, and the police and the like may be sources of information.

Figure 18:
FIG. 18 is a view showing an example of anonymous information.

For example, a personal user who wants to know the current state of Roppongi requests images sensed by a camera installed on a street of Roppongi. The user issues an access request including a search request text {category: not designated, item 1: Roppongi, item 2: real time}The National Police Agency that controls cameras installed in Roppongi provides, e.g., anonymized image information (anonymous information) as shown in FIG. 18, i.e., information obtained by removing personal information (e.g., the image information of face portions) from a sensed image (by using the personal information extracting unit 24).

As described above, according to the above embodiment, first information including anonymous information (such as vital data including pulse and body temperature related to that person) and personal information (e.g., a personal ID) is acquired. The personal information is separated from the first information to obtain anonymous information (that is not added or associated with the personal information). Each of the anonymous information and personal information is assigned level that defines the level of the access right that limits accessible users. The anonymous information and personal information are separately stored in the structured accessible information storing unit 3 as independent information. Only a temporary ID makes the two pieces of information correspond to each other. The information item that represents the correspondence between the temporary ID and the personal ID that identifies the personal information is stored in the associating unit 22.

When an access request to access the first information is received, and the level of the access right defined in advance for the user who has sent the access request allows access to the anonymous information of the first information, the anonymous information is provided to the user at the request source. When the level of the access right also allows access to the personal information, the anonymous information is provided to the user at the request source together with the personal information.

When second information including personal information is acquired, the personal information is separated from the second information to generate anonymous information (that doesn't include personal information). Each of the anonymous information and personal information is assigned the level of the access right that limits accessible users. The anonymous information and personal information are separately stored in the structured accessible information storing unit 3 as independent information. Only a temporary ID makes the two pieces of information correspond to each other. The information item that represents the correspondence between the temporary ID and the personal ID that identifies the personal information is stored in the associating unit 22.

When an access request to access the second information is received, and the level of the access right defined in advance for the user who has sent the access request inhibits access to the personal information, the anonymous information of the second information corresponding to the access request is read out and provided. When the level of the access right allows access to the personal information, the original second information is generated from the personal information and anonymous information corresponding to the second information. The generated original second information is provided to the user at the request source.

In the above way, when information added with personal information or information including personal information is acquired, the personal information added to or included in the information is separated from the acquired information to generate anonymous information. The generated anonymous information and personal information are separately stored as individual information. The anonymous information and personal information are separated in advance and stored. For this reason, when the anonymous information ("information that need not be kept secret") is provided to another user, it is impossible to search for the personal information ("information to be kept secret") on the basis of the provided information. Hence, even information including vital data and personal information or information (e.g., image information) including personal information can be used by a third party without being accessed by him/her.

The information anonymizing system according to this embodiment facilitates use of information while protecting the privacy of individuals and can therefor greatly contribute to research and development in medical facilities and the like. Since an access right is defined in advance for "information to be kept secret" such as personal information, any user who has an access right of level that allows access to the information can refer to even the "information to be kept secret" such as personal information.

Hence, an information sharing environment can be realized in which while protecting important information such as personal information from being open to a third party without permission, anonymized information can be actively used such that data mining can easily and effectively be done.

Second Embodiment

The mechanism of an information use service using the information anonymizing system 100 described in the first embodiment will be described next as the second embodiment.

Figure 19:
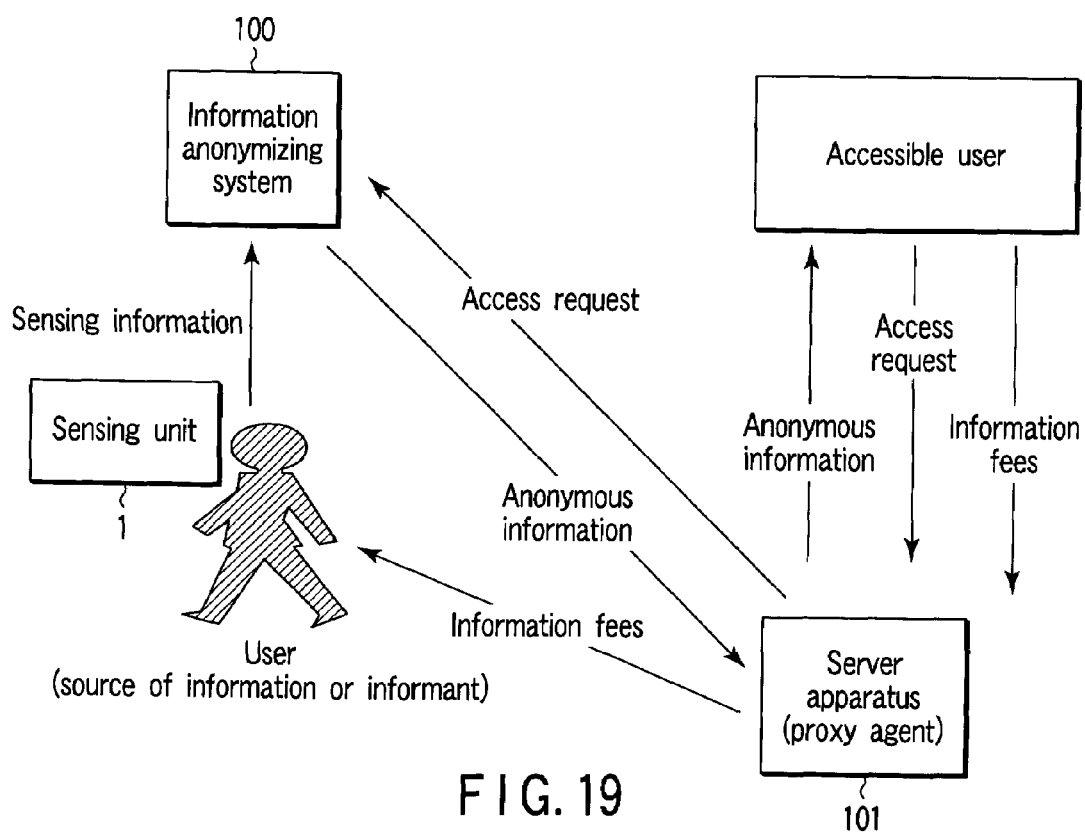
FIG. 19 is a view for explaining the mechanism of an information use service using the information anonymizing system described in the first embodiment.

FIG. 19 is a view for explaining the mechanism of the information use service using the information anonymizing system 100. Referring to FIG. 19, the information anonymizing system 100 according to the first embodiment acquires information such as information including vital data and personal information or image information including personal information through a sensing unit 1 attached to a user as a source of information. When "information to be kept secret" such as personal information is included in the acquired information, the "information to be kept secret" (e.g., personal information that can specify an individual) is separated from the acquired information, and the anonymous information and personal information are separately stored, as described in the first embodiment. Only a temporary ID that is valid in the information anonymizing system serves as a link key for the two pieces of information. (The two pieces of information the anonymous are information and personal information.)

On the other hand, an access request including a search request text transmitted from the terminal of an accessible user such as a doctor is received by a server apparatus 101 serving as a proxy agent. The server apparatus 101 transfers the access request to the information anonymizing system 100. On the basis of obtained anonymous information, the server apparatus 101 creates a report suitable for the search request text as shown in, e.g., FIG. 15.

The server apparatus 101 pays, to the source of information, information fees corresponding to the information provided by the source of information. The server apparatus 101 collects, from the accessible user, information fees for use of the information.

According to the information providing service system shown in FIG. 19, anonymous information obtained by separating personal information in advance from information added with or including the personal information is provided. Hence, even information including "information to be kept secret" such as personal information provided from an individual can smoothly and effectively be used by a third party while reliably holding the "information to be kept secret" in confidence.

The method of the present invention described in the embodiments of the invention can be stored in a recording medium such as a magnetic disk (e.g., a floppy disk or hard disk), optical disk (e.g., a CD-ROM or DVD), or semiconductor memory and distributed as a program to be executed by a computer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information sharing apparatus, which communicates with a plurality of terminals corresponding to a plurality of users respectively, comprising:
    a first receiving unit configured to receive an authentication request including authentication information of a first user;
    an authentication unit configured to execute personal authentication by using the authentication information to obtain, if the authentication information is authentic, a first pass ID and a second pass ID, wherein a value of the first pass ID is equal to a value of the second pass ID;
    a transfer unit configured to transfer one of the first pass ID or the second pass ID as a transferred pass ID to a first terminal which corresponds to the first user, and store the one of the first pass ID or the second pass ID that is not transferred as a stored pass ID;
    a second receiving unit configured to receive the transferred pass ID and an information item including an image of a person;
    a first generation unit configured to generate a temporary ID for identifying the information item when the transferred pass ID is equal to the stored pass ID;

an extracting unit configured to extract a contour of a person's face from the information item to detect an image of the person's face as a personal information item;

a second generating unit configured to generate an anonymous information item, which is the information item without the image of the person's face, by separating the detected personal information item from the information item;

a first storing unit configured to store a pair including the temporary ID and a personal ID corresponding to the personal information item;

an encrypting unit configured to encrypt the personal information item;

a second storing unit configured to store the encrypted personal information item and the anonymous information item to which the temporary ID and one of a plurality of levels corresponding to the personal information item are added, the plurality of levels including (a) a first access level which is assigned to a first group of users, the first group of users including users who can access only the anonymous information item out of the anonymous information item and the personal information items, and (b) a second access level which is assigned to a second group of users, the second group of users including users who can access both of the anonymous information item and the personal information item;

a third receiving unit configured to receive a request message for accessing the information item, the request message being transmitted from a second terminal;

a first transmitting unit configured to transmit only the anonymous information item out of the anonymous information item and the personal information item to the second terminal in response to the request message, when an access level predetermined to a second user corresponding to the second terminal is equal to the first access level;

a synthesizing unit configured to synthesize the personal information item with the anonymous information item to obtain a regenerated information item including the image of the person's face; and a second transmitting unit configured to transmit the regenerated information item in response to the request message, when the access level of the second user is equal to the second access level.

2. An apparatus according to claim 1, wherein the synthesizing unit includes:

a first acquiring unit configured to acquire the pair based on the temporary ID added to the anonymous information item, to obtain the personal ID of the pair; and a second acquiring unit configured to acquire, from the second storing unit, the personal information item which corresponds to the personal ID of the pair and is to be synthesized with the anonymous information item.

3. An apparatus according to claim 1, wherein the second generating unit generates the anonymous information item by overwriting an area corresponding to the personal information item with arbitrary symbols.

4. A method for sharing acquired information items with a plurality of terminals corresponding to a plurality of users respectively, comprising:

receiving an authentication request including authentication information of a first user of the plurality of users;

executing personal authentication by using the authentication information to obtain, if the authentication information is authentic, a first pass ID and a second pass ID, wherein a value of the first pass ID is equal to a value of the second pass ID;

transferring one of the first pass ID or the second pass ID as a transferred pass ID to a first terminal which corresponds to the first user;

storing one of the first pass ID or the second pass ID that is not transferred as a stored pass ID;

receiving the transferred pass ID and an information item including an image of a person;

generating a temporary ID for identifying the information item when the transferred pass ID is equal to the stored pass ID;

extracting a contour of a person's face from the information item to detect an image of the person's face as a personal information item;

generating an anonymous information item, which is the information item without the image of the person's face, by separating the detected personal information item from the information item;

storing, in a first memory, a pair including the temporary ID and a personal ID corresponding to the personal information item;

encrypting the personal information item;

storing, in a second memory, the encrypted personal information item and the anonymous information item to which the temporary ID and one of a plurality of levels corresponding to the personal information item are added, the plurality of levels including (a) a first access level which is assigned to a first group of users, the first group of users including users who can access only the anonymous information item out of the anonymous information item and the personal information item, and (b) a second access level which is assigned to a second group of users, the second group of users including users who can access both of the anonymous information item and the personal information item;

receiving a request message for accessing the information item, the request message being transmitted from a second terminal;

transmitting, in response to the request message, only the anonymous information item out of the anonymous information item and the personal information item to the second terminal when an access level predetermined to a second user corresponding to the second terminal is equal to the first access level;

synthesizing the personal information item with the anonymous information item, to obtain a regenerated information item including the image of the person's face; and transmitting, in response to the request message, the regenerated information item when the access level of the second user is equal to the second access level.

5. A method according to claim 4, wherein the synthesizing includes:

acquiring the pair, based on the temporary ID added to the anonymous information item, to obtain the personal ID of the pair; and acquiring, from the second memory, the personal information item which corresponds to the personal ID of the pair and is to be synthesized with the anonymous information item.

6. A method according to claim 4, wherein the generating the anonymous information item generates the anonymous information item by overwriting an area corresponding to the personal information item with arbitrary symbols.

* * * * *